United States Patent
Robitaille et al.

(10) Patent No.: US 11,157,660 B2
(45) Date of Patent: Oct. 26, 2021

(54) VIRTUAL HOST UPGRADE USING A SECURED DISK IMAGE

(71) Applicant: EMC IP Holding Company LLC, Hopkinton, MA (US)

(72) Inventors: Debra J. Robitaille, Hopkinton, MA (US); Mark Arakelian, Shirley, MA (US); Venkat M. Reddy, Bangalore (IN); Kannan Subbaraman, Bangalore (IN); Tamilarasan Janakiraman, Hosur (IN); Parthasarathi Ilangovan, Bangalore (IN); Kiran Kumar G. Ramegowda, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 183 days.

(21) Appl. No.: 16/656,096

(22) Filed: Oct. 17, 2019

(65) Prior Publication Data

US 2021/0117577 A1    Apr. 22, 2021

(51) Int. Cl.
*H04L 29/06* (2006.01)
*G06F 21/80* (2013.01)
(Continued)

(52) U.S. Cl.
CPC ............ *G06F 21/80* (2013.01); *G06F 3/0607* (2013.01); *G06F 3/0664* (2013.01);
(Continued)

(58) Field of Classification Search
CPC .......... G06F 21/33; G06F 21/53; G06F 21/57; G06F 21/64; G06F 21/80; G06F 21/6218; G06F 3/0607; G06F 3/0664; G06F 3/0673

See application file for complete search history.

(56) References Cited

U.S. PATENT DOCUMENTS

2005/0086300 A1* 4/2005 Yeager .................. H04L 69/329
                                                                        709/204
2010/0169224 A1* 7/2010 Ramberg ............... G06Q 30/00
                                                                        705/71

(Continued)

OTHER PUBLICATIONS

Wikipedia, "ISO Image," https://en.wikipedia.org/wiki/ISO_image, Sep. 22, 2019, 3 pages.

(Continued)

*Primary Examiner* — Kevin Bechtel
*Assistant Examiner* — Hany S. Gadalla
(74) *Attorney, Agent, or Firm* — Ryan, Mason & Lewis, LLP

(57) ABSTRACT

An apparatus comprises at least one processing device coupled to memory. The at least one processing device is configured to obtain a secured disk image comprising an encrypted manifest file, an encrypted install binary and a plurality of other files. The at least one processing device is further configured to obtain a certificate corresponding to the secured disk image and to derive a public key based at least in part on the certificate. The at least one processing device is further configured to decrypt the manifest file and the install binary based at least in part on the public key and to validate checksums for respective ones of the plurality of other files against corresponding checksums contained in the decrypted manifest file. The at least one processing device is further configured to execute the decrypted install binary responsive to validation of the checksums for the respective ones of the plurality of other files.

20 Claims, 9 Drawing Sheets

(51) Int. Cl.
*G06F 21/64* (2013.01)
*G06F 21/33* (2013.01)
*G06F 3/06* (2006.01)
*G06F 21/62* (2013.01)

(52) U.S. Cl.
CPC ............ *G06F 3/0673* (2013.01); *G06F 21/33* (2013.01); *G06F 21/6218* (2013.01); *G06F 21/64* (2013.01)

(56) References Cited

U.S. PATENT DOCUMENTS

| | | | |
|---|---|---|---|
| 2014/0337411 A1* | 11/2014 | Panje | H04N 21/8456 709/203 |
| 2016/0234625 A1* | 8/2016 | Wang | H04L 67/06 |
| 2017/0220330 A1* | 8/2017 | Soini | G06F 8/61 |
| 2019/0220271 A1* | 7/2019 | Olderdissen | G06F 8/654 |
| 2020/0267004 A1* | 8/2020 | Lounsberry | H04L 9/0662 |

OTHER PUBLICATIONS

Wikipedia, "Virtual Machine," https://en.wikipedia.org/wiki/Virtual_machine, Sep. 21, 2019, 6 pages.

ECMA International, "Volume and File Structure of CDROM for Information Interchange," Standard ECMA-119, 3rd Edition, Dec. 2017, 72 pages.

wiki.osdev.org, "ISO 9660," https://wiki.osdev.org/ISO_9660, Jun. 26, 2019, 12 pages.

\* cited by examiner

VIRTUAL HOST UPGRADE USING A SECURED DISK IMAGE

FIELD

The field relates generally to information processing systems, and more particularly to upgrading virtual hosts in information processing systems.

BACKGROUND

A locked down virtual host such as, e.g., a container, a virtual appliance, virtual machine or other virtualization infrastructure, does not provide command-line shell access to the end user. The user interaction with the system is typically available only through a web-interface or application programming interface (API) based user interface (UI) in a console. To upgrade a locked down virtual host, upgrade software is often bundled as a non-bootable disk image and shared to the end user. The end user then mounts the disk image to the virtual host and performs the upgrade.

SUMMARY

Illustrative embodiments provide techniques for upgrading a virtual host in a storage system using a secured disk image. For example, in one embodiment, an apparatus comprises at least one processing device coupled to memory. The at least one processing device is configured to obtain a secured disk image comprising an encrypted manifest file, an encrypted install binary and a plurality of other files. The at least one processing device is further configured to obtain a certificate corresponding to the secured disk image and to derive a public key based at least in part on the certificate. The at least one processing device is further configured to decrypt the manifest file and the install binary based at least in part on the public key and to validate checksums for respective ones of the plurality of other files against corresponding checksums contained in the decrypted manifest file. The at least one processing device is further configured to execute the decrypted install binary responsive to validation of the checksums for the respective ones of the plurality of other files.

In another embodiment, an apparatus comprises at least one processing device coupled to memory. The at least one processing device is configured to build a secured disk image based at least in part on a manifest file, install binary and a plurality of other files. The manifest file comprises checksums corresponding to one or more of the other files. The building of the secured disk image comprises encrypting the manifest file using a private key and encrypting the install binary using the private key. The building of the secured disk image further comprises generating the secured disk image based at least in part on the encrypted manifest file, encrypted install binary and the plurality of other files.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
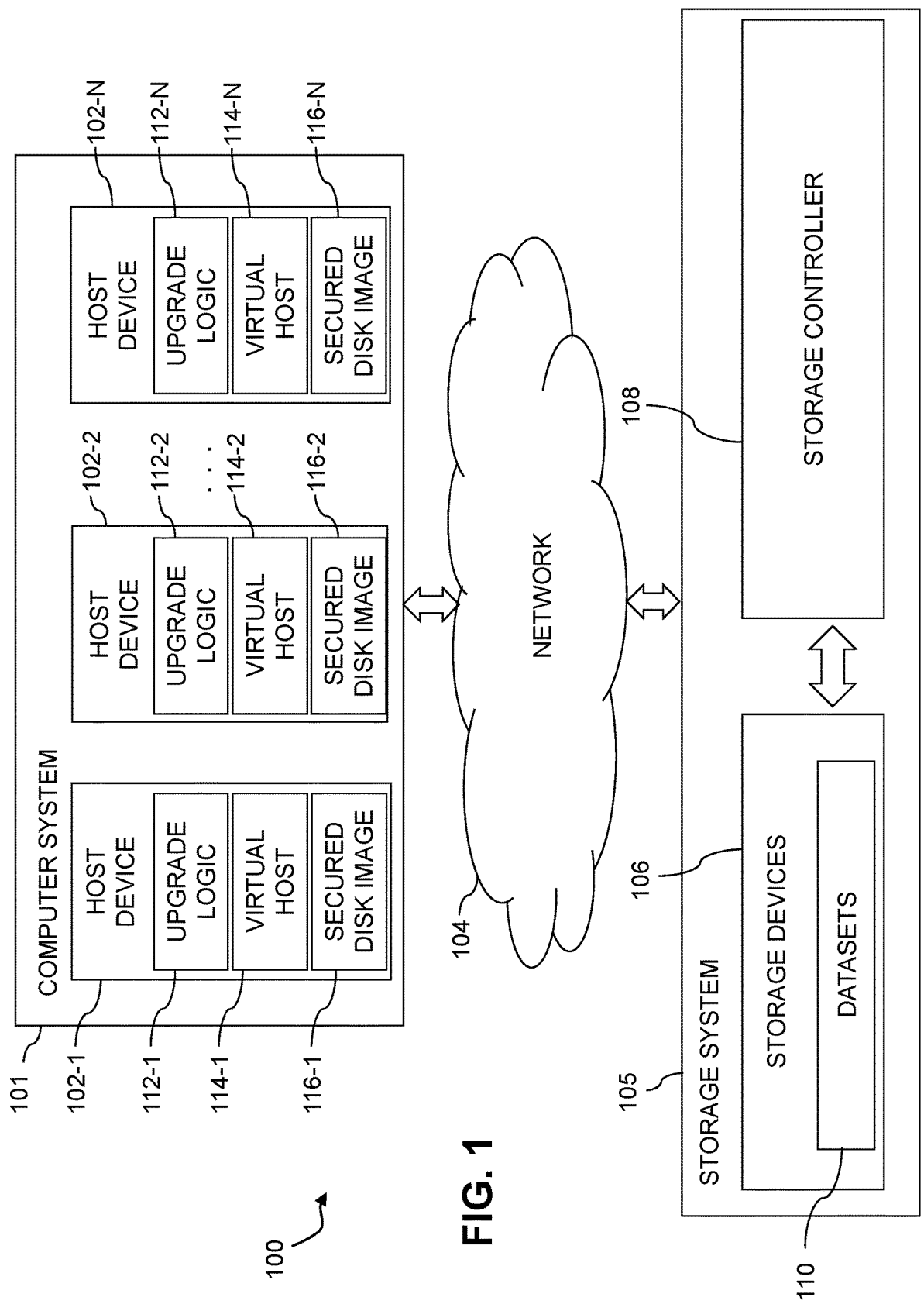
FIG. 1 is a block diagram of an information processing system comprising a storage system configured with virtual host upgrade functionality in an illustrative embodiment.

FIG. 1 shows an information processing system 100 configured in accordance with an illustrative embodiment. The information processing system 100 comprises a computer system 101 that includes host devices 102-1, 102-2, ... 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual hosts such as, e.g., virtual machines, containers, virtual appliances, or other virtualization infrastructure, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

In illustrative embodiments, the host devices 102 comprise respective upgrade logic 112-1, 112-2 . . . 112-N, also referred to herein collectively or individually as upgrade logic 112, virtual hosts 114-1, 114-2 . . . 114-N, also referred to herein collectively or individually as virtual hosts 114, and secured disk images 116-1, 116-2 . . . 116-N, also referred to herein collectively or individually as secured disk images 116, each of which will be described in more detail below.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store datasets 110, which may comprise logical storage volumes, snapshots or other arrangements of data.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage system 105 should also be understood to include additional modules and other components typically found in conventional implementations of storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 7-9.

It is to be appreciated that these and other features of illustrative embodiments are presented by way of example only and should not be construed as limiting in any way.

Accordingly, different numbers, types and arrangements of system components such as host devices 102, network 104, storage system 105, storage devices 106, storage controller 108, datasets 110, upgrade logic 112, virtual hosts 114, secured disk images 116, software provider 200 (FIG. 2) and build logic 202 (FIG. 2) can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, virtual host upgrade functionality for the upgrade logic 112 can be implemented in the storage system, in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

With reference again to FIGS. 1 and 2, referring only to host device 102-1 for brevity, upgrade logic 112-1 comprises processes or other logic that may be executed or implemented by a processing device of host device 102-1 to install a virtual host 114-1 on the host device 102-1 or upgrade a virtual host 114-1 already installed on the host device 102-1. As an example, a secured disk image 116-1 may be obtained by upgrade logic 112-1, for example, from a software provider 200 or other vendor of the virtual host 114-1, and may be mounted to the host device 102-1 as a virtual drive. The secured disk image 116-1 may then be activated or otherwise accessed by the upgrade logic 112-1 to trigger an installation or update of a virtual host 114-1 on the host device 102-1.

Figure 2:
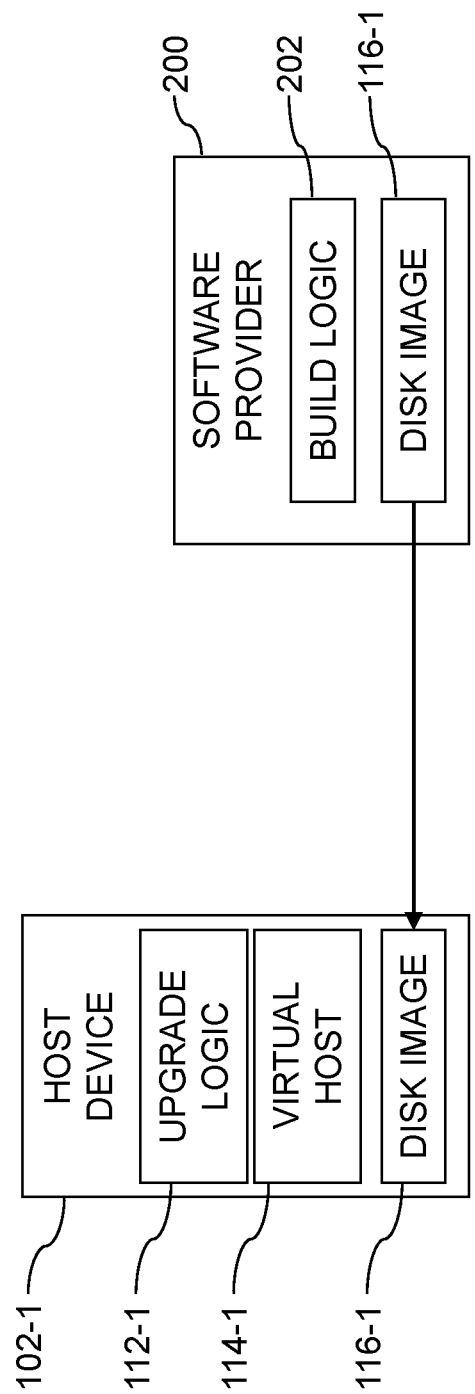
FIG. 2 is a block diagram illustrating a host device of the information processing system of FIG. 1 in communication with a software provider in an illustrative embodiment.

With continued reference to FIG. 2, for example, a software provider 200 comprises build logic 202 that is configured to build a secured disk image 116-1 which comprises features that inhibit tampering and provide authentication of the integrity of the secured disk image 116-1. The host device 102-1 or an end user of the host device 102-1 obtains the secured disk image 116-1 from the software provider 200, for example, either physically or electronically. For example, the secured disk image 116-1 may be transmitted from the software provider 200 to the host device 102-1 over a network such as, e.g., the Internet, may be mailed to the end user of the host device 102-1 as a physical package, or delivered to the end user of the host device 102-1 in any other manner. In some embodiments, for example, the secured disk image 116-1 may be stored on a computer readable medium such as, e.g., a compact disk (CD), digital versatile disk (DVD), blue-ray, universal serial bus (USB) memory device, or any other computer readable medium, and provided to the end user of the host device 102-1 for installation or mounting on host device 102-1.

While host device 102-1 is illustrated in FIG. 1 and described herein as comprising a single virtual host 114-1 and corresponding upgrade logic 112-1 and secured disk image 116-1 for brevity, it is understood that host device 102-1 may comprise any other number of virtual hosts 114 and corresponding upgrade logic 112 and secured disk images 116.

During a typical upgrade of a virtual host, there is no standard procedure to inhibit the installable files and software package from being tampered with and generally no consideration is given to making such installable files and software package tamper proof. Often, in a locked down virtual host, manual checking of the software for tampering cannot be performed. While software providers often do follow particular protocols for securing software these protocols typically fall short of protecting such software packages against tampering, especially in the case of non-bootable disk images such as, e.g., ISO images.

For example, a software provider may sign a given software package by generating a checksum using a hashing algorithm such as, e.g., MD5, which is provided to the end user with the software package or separately from the software package. The end user then performs their own hash of the software package using the same hashing algorithm to generate a corresponding checksum which is compared to the checksum provided by the software provider. In this manner, end users are typically assured that the software package is received from the authentic channel, i.e., the software provider, when the checksums match. However, there is no assurance that the software package itself has not been tampered with.

For example, in some cases an end user of a host device may perform the following steps to upgrade a locked down virtual host:

1. A non-bootable disk image such as, e.g., an International Organization for Standardization (ISO) image, containing red hat package manager (RPM) files and an installable file is shipped to the software provider.

2. The end user attaches the disk image to the locked down virtual host.

3. The upgrade process is triggered from an appliance UI console.

4. Without disk image validation or with minimalistic disk image validation such as, e.g., checksum verification, the upgrade process starts by executing an install binary.

5. Post-upgrade scripts are invoked to check if the upgrade installed successfully.

6. A reboot of the virtual host is performed to make the upgrade persistent.

7. The end user then uses the upgraded virtual host, for example, to service IO operations for an application running on the host device.

Such a process, however, does not ensure that the content of the disk image was not tampered with at some point after creation of the disk image but prior to the generation of the checksum by the software provider. In addition, in some cases, the checksum for the disk image that is provided to the host device for comparison may have been generated by an intermediary provider such as a file hosting server or other entity rather than the creator of the disk image. For example, the disk image may have already been tampered with after creation but before generation of the checksum by the intermediary provider. In such a case, the tampering would not be caught by checking the checksum, which simply validates that the disk image obtained from the intermediary provider is the same as the disk image stored on the intermediary provider. A validated checksum in such a case cannot be used to determine whether or not the disk image has been tampered with between the time it was created by a software provider and the time it was obtained by the host device.

In illustrative embodiments, an upgrade process is disclosed which utilizes build logic on the software provider side that builds a secured disk image with features that inhibit tampering and upgrade logic on the end user host device side that relies on these features to validate the integrity of the secured disk image before execution of the upgrade of a virtual host residing on the host device. In the embodiment illustrated in FIG. 2, for example, the upgrade process is split between the software provider 200, which utilizes build logic 202 to build the secured disk image 116-1 for upgrading virtual host 114-1 of host device 102-1, and host device 102-1 which utilizes upgrade logic 112-1 to perform the upgrade of virtual host 114-1 utilizing the secured disk image 116-1. As mentioned above, while the upgrade process is described with reference to host device 102-1, upgrade logic 112-1, virtual host 114-1 and secured disk image 116-1, any of the host devices 102, upgrade logic 112, virtual hosts 114 and secured disk images 116 may perform the same or a similar upgrade process. In addition, while only virtual host 114-1 is mentioned in the examples provided below, any other virtual host 114 residing on host device 102-1 or on other host devices 102 may be upgraded in similar manner.

The upgrade process may illustratively comprise four sub-processes including the creation of a certificate, a first-time deployment of the virtual host to the host device of the end user, the building of a secured disk image for the upgrade, and the installation of the upgrade from the secured disk image. While described as comprising four sub-processes, the upgrade process may alternatively comprise additional sub-processes or fewer sub-processes.

Figure 3:
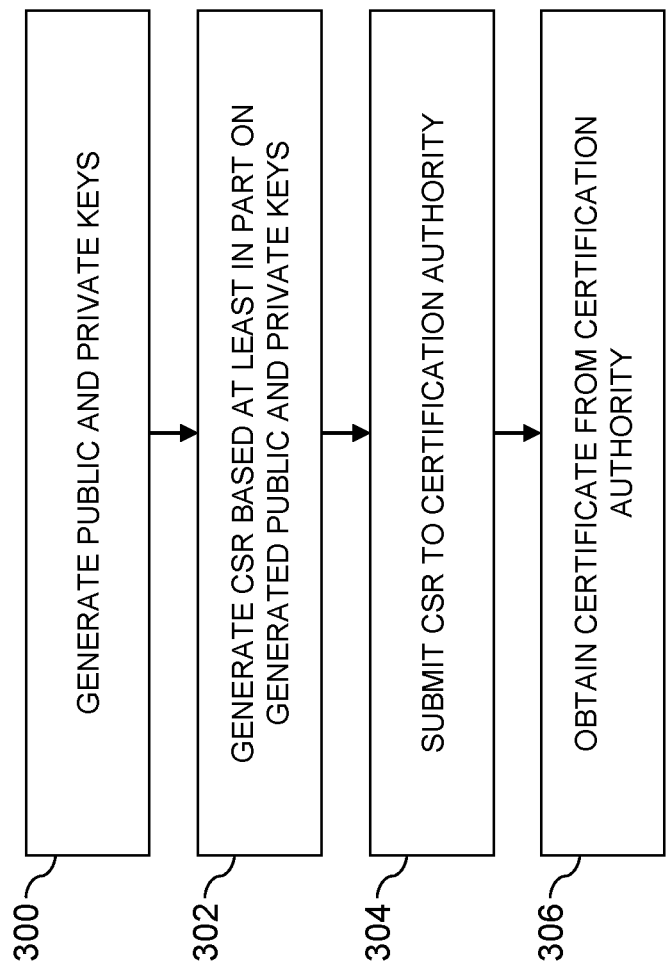
FIG. 3 is a flow diagram of an example process for generating a certificate in an illustrative embodiment.

The creation of the certificate will now be described in further detail with reference to the flow diagram of the illustrative embodiment of FIG. 3. The process as shown in FIG. 3 includes steps 300 through 306. The steps of FIG. 3 are illustratively performed at least in part under the control of one or more processing devices of the software provider 200 executing build logic 202.

At step 300, build logic 202 generates paired public and private keys. For example, software provider 200 may utilize any common public and private key generation algorithm to generate the keys.

At step 302, build logic 202 generates a certificate signing request (CSR) based at least in part on one or both of the generated public and private keys.

At step 304, build logic 202 submits the CSR to a certification authority. Any commonly used certificate authority may be used.

At step 306, build logic 202 obtains a certificate from the certification authority that was generated based at least in part on the submitted CSR.

This certificate may now be utilized, for example, by host device 102-1, to derive a public key for decrypting files which were encrypted by the private key.

Figure 4:
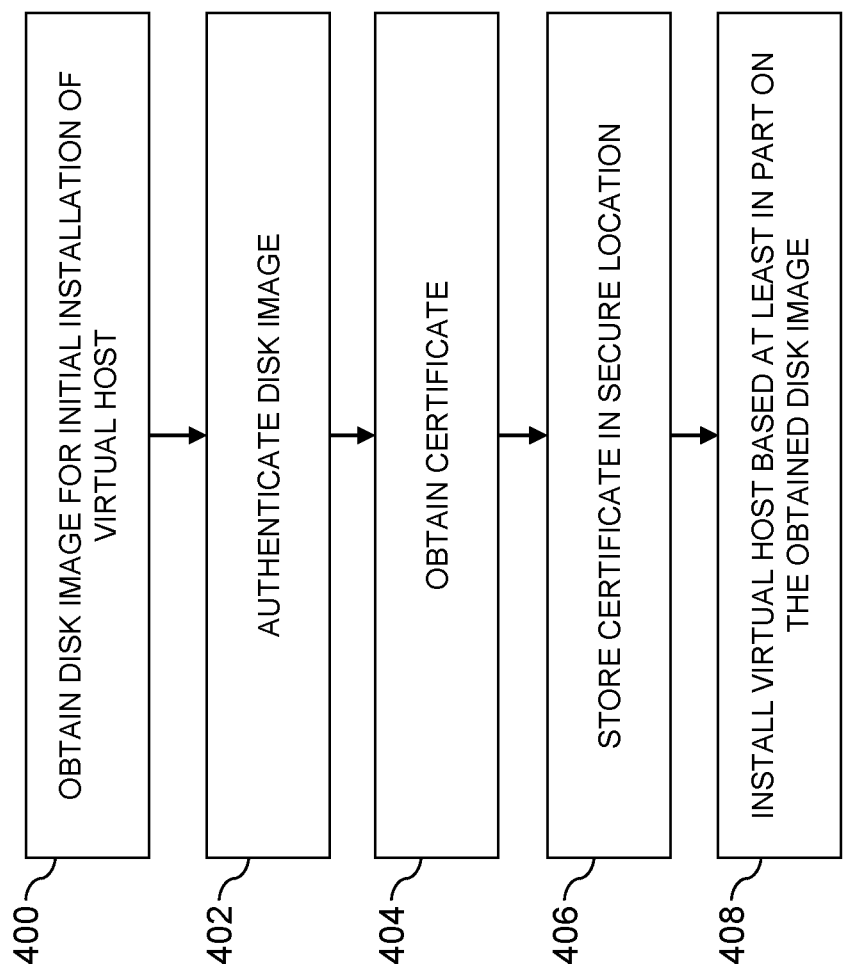
FIG. 4 is a flow diagram of an example process for performing an initial installation of a virtual host in an illustrative embodiment.

The first-time deployment of the virtual host to the host device of the end user will now be described in further detail with reference to the flow diagram of the illustrative embodiment of FIG. 4. The process as shown in FIG. 4 includes steps 400 through 408. The steps of FIG. 4 are illustratively performed at least in part under the control of one or more processing devices of the host device 102-1 executing upgrade logic 112-1.

At step 400, the host device 102-1 obtains an initial installation disk image for the initial installation of the virtual host, for example, from the software provider 200 or a third party. For example, the initial installation disk image may be electronically provided to the host device 102-1 or physically shipped to an end user of the host device 102-1. In some embodiments, the initial installation disk image for the initial installation may comprise or be bundled with the certificate generated by the process of FIG. 3 for delivery to the host device 102-1. The initial installation disk image may be obtained electronically, via physical deliver to an end user operating or utilizing host device 102-1, or in any other manner.

At step 402, the host device 102-1 authenticates the initial installation disk image, for example, by hashing the disk image and comparing the hash checksum to a checksum provided by the software provider 200, in the manner described above.

At step 404, the host device 102-1 obtains the certificate. For example, in an embodiment where the certificate is included as part of the initial installation disk image, the certificate is extracted from the initial installation disk image. In some embodiments, the certificate may be separately provided to the host device 102-1 by software provider 200 in another manner.

At step 406, the host device 102-1 stores the certificate in a secure location. In some embodiments, the secure location may be a location specified by the software provider 200 either as part of the initial installation disk image or via another communication.

At step 408, the host device 102-1 installs the virtual host 114-1 on the host device based at least in part on the initial installation disk image, for example, by executing install binaries or other file of the initial installation disk image to perform the installation process.

With the virtual host 114-1 installed on the host device 102-1, the host device 102-1 may utilize the virtual host 114-1 to service applications or perform other processing operations. In some embodiments, the host device 102-1 may lock down the virtual host 114-1 to inhibit tampering or other undesired changes to the virtual host 114-1.

Figure 5:
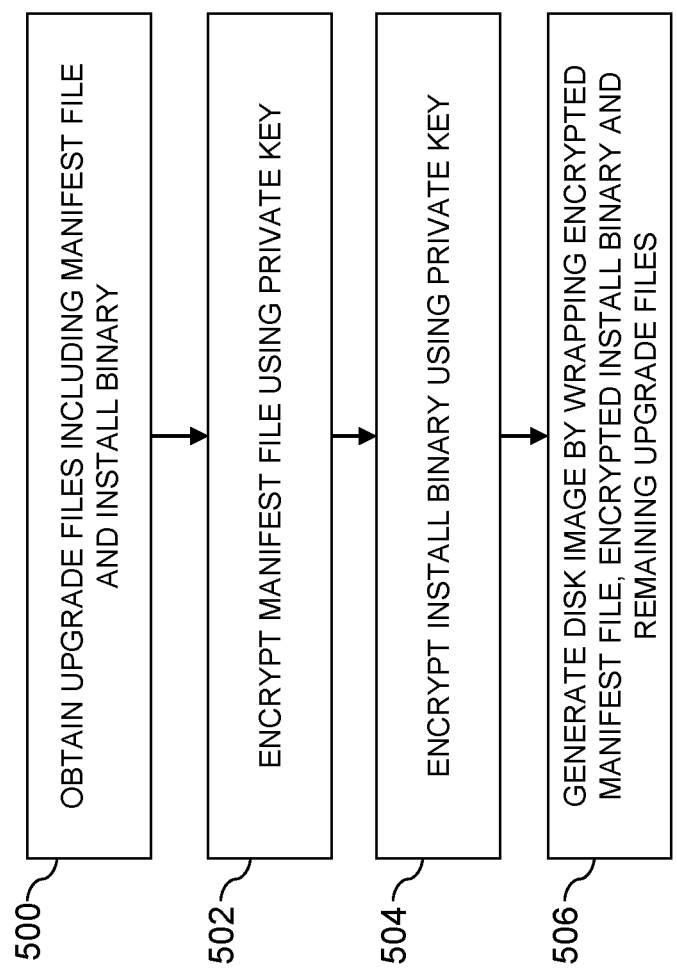
FIG. 5 is a flow diagram of an example process for generating a secured disk image for upgrading a virtual host in an illustrative embodiment.

The building of a secured disk image for the upgrade will now be described in further detail with reference to the flow diagram of the illustrative embodiment of FIG. 5. The process as shown in FIG. 5 includes steps 500 through 506. The steps of FIG. 5 are illustratively performed at least in part under the control of one or more processing devices of the software provider 200 executing build logic 202.

At step 500, build logic 202 obtains upgrade files for use in upgrading a virtual host. For example, the upgrade files may comprise, e.g., software packages, executables, scripts, a concierge binary, setup files, miscellaneous files, a manifest file and install binaries. In some embodiments, for example, the upgrade files may be obtained from a software repository of the software provider 202. In illustrative embodiments, the manifest file comprises a listing of some or all of the other files in the upgrade files and comprises checksums for one or more of the listed files. For example, in some embodiments, the manifest file may comprise checksums for one or more of the software packages, executables, scripts, setup files and miscellaneous files. In some embodiments, the manifest file may also comprise checksums for the one or more of the concierge binary and the install binaries.

At step 502, build logic 202 encrypts the manifest file using the private key generated at step 300 (FIG. 3).

At step 504, build logic 202 encrypts the install binaries using the private key generated at step 300 (FIG. 3).

At step 506, build logic 202 generates a secured disk image 116-1, for example, by wrapping or bundling the encrypted manifest file, encrypted install binaries, and remaining upgraded files. For example, in illustrative embodiments only the manifest file and install binaries are encrypted in the secured disk image 116-1. In some embodiments one or more of the remaining upgrade files such as, e.g., the software packages, executables, scripts, a concierge binary, setup files, miscellaneous files may also be encrypted with the private key prior to generation of the secured disk image 116-1.

In this manner, a secured disk image 116-1 is generated which includes protections against tampering by using encryption on the manifest file and install binaries.

Figure 6:
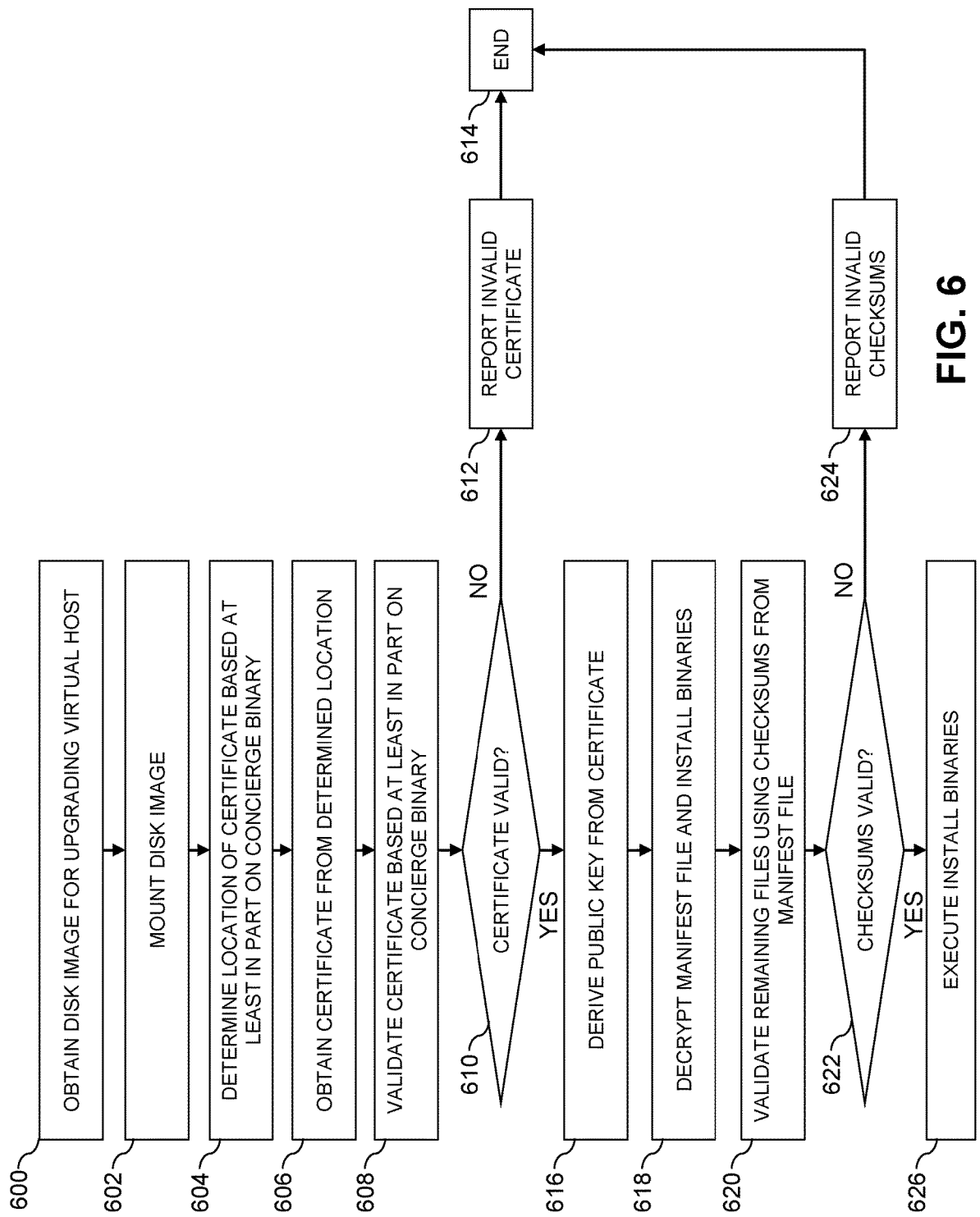
FIG. 6 is a flow diagram of an example process for upgrading a virtual host using a secured disk image in an illustrative embodiment.

The upgrade of virtual host 114-1 will now be described in further detail with reference to the flow diagram of the illustrative embodiment of FIG. 6. The process as shown in FIG. 6 includes steps 600 through 626. The steps of FIG. 6 are illustratively performed at least in part under the control of one or more processing devices of the host device 102-1 executing upgrade logic 112-1.

At step 600, upgrade logic 112-1 obtains a secured disk image 116-1 for upgrading a virtual host 114-1, for example, from the software provider 200 or a third party. For example, the secured disk image 116-1 may be electronically provided to the host device 102-1 or physically shipped to an end user of the host device 102-1. In some embodiments, secured disk image 116-1 for the upgrade may comprise or be bundled with a new certificate generated by the process of FIG. 3 for delivery to the host device 102. The secured disk image 116-1 may be obtained electronically, via physical delivery to an end user operating or utilizing host device 102-1, or in any other manner.

At step 602, upgrade logic 112-1 mounts the secured disk image 116-1 to the virtual host 114-1.

At step 604, upgrade logic 112-1 determines the location of certificate based at least in part on concierge binary included in the secured disk image 116-1. For example, the concierge binary may comprise a path to the location of the certificate or another indication of the location of the certificate.

At step 606, upgrade logic 112-1 obtains the certificate from the determined location.

At step 608, upgrade logic 112-1 validates the certificate based at least in part on information contained in the concierge binary. For example, the concierge binary may comprise a trust store that includes authenticating information that may be utilized by upgrade logic 112-1 to validate the certificate. For example, the concierge binary may be utilized by upgrade logic 112-1 to validate a signature of the certificate and ensure that the certificate is signed by a trusted certificate authority. The trusted certificate authority may be a certificate authority that is included in a list of trusted certificate authorities contained in the concierge binary. In some embodiments, upgrade logic 112-1 may also check a validity period associated with the certificate to ensure that the certificate has not expired. In some embodiments, upgrade logic 112-1 may also utilize the information contained in the concierge binary to determine the identity of the certificate issuer and verify that the certificate issuer is included in the list of trusted certificate authorities.

At step 610, upgrade logic 112-1 determines whether or not the certificate is valid based on the validation. If the certificate is not valid, upgrade logic 112-1 reports an invalid certificate to the end user of the host device 102-1 at step 612 and then ends at step 614. If the certificate is valid, the process proceeds to step 616 and upgrade logic 112-1 derives the public key from the certificate.

At step 618, upgrade logic 112-1 decrypts the manifest file and install binaries using the derived public key.

At step 620, upgrade logic 112-1 validates one or more of the remaining files in the secured disk image 116-1 using the checksum values from the manifest file. For example, upgrade logic 112-1 may validate one or more of the software packages, executables, scripts, setup files, and miscellaneous files contained in the secured disk image 116-1. In some embodiments, upgrade logic 112-1 may also validate the install binaries based at least in part on checksums contained in the manifest file.

At step 622, upgrade logic 112-1 determines whether or not the checksums for the validated files are valid. If one or more of the checksums are not valid, upgrade logic 112-1 reports an invalid checksum to the end user of the host device 102-1 at step 624 and the ends at step 614. If all of the checksums are valid, the process proceeds to step 626 and upgrade logic 112-1 executes install binaries to upgrade the virtual host 114-1.

It is to be understood that for any methodologies described herein with reference to the flow diagrams of FIGS. 3-6, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 108 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 or the storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate the virtual host upgrade functionality as disclosed herein.

An illustrative embodiment of such a content addressable storage system will now be described with reference to FIG. 7. In this embodiment, a content addressable storage system 705 comprises a plurality of storage devices 706 and an associated storage controller 708. The content addressable storage system 705 may be viewed as a particular implementation of the storage system 105, and accordingly is assumed to be coupled to host devices 102 of computer system 101 via network 104 within information processing system 100.

The storage controller 708 in the present embodiment is configured to implement functionality of the type previously described in conjunction with storage controller 108 of FIG. 1.

The storage controller 708 includes one or more processing devices each comprising a plurality of cores, which are configured to operate in a manner similar to that described above for storage controller 108.

Figure 7:
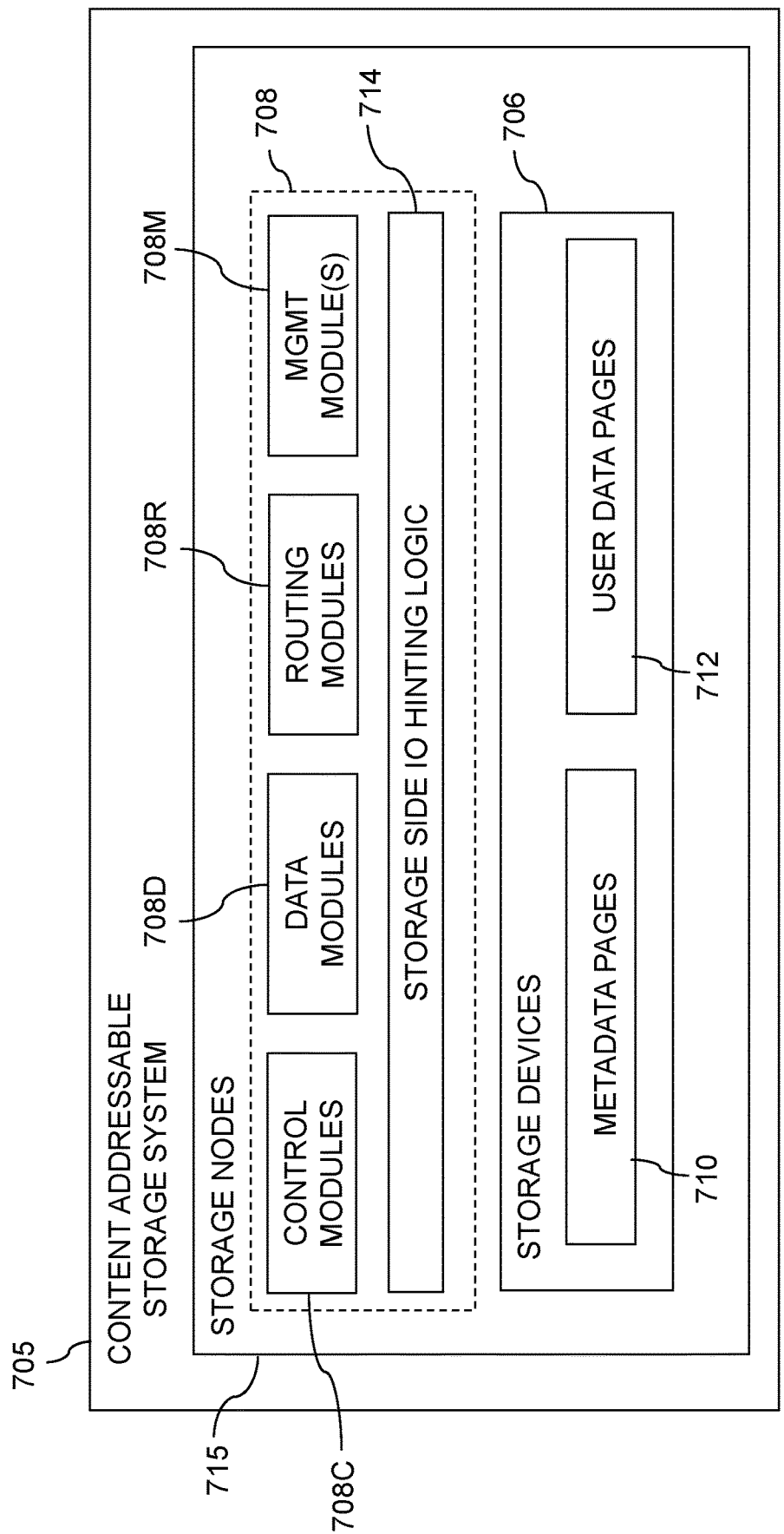
FIG. 7 shows a content addressable storage system having a distributed storage controller configured for implementing the virtual host upgrade functionality in an illustrative embodiment.

The content addressable storage system 705 in the FIG. 7 embodiment is implemented as at least a portion of a clustered storage system and includes a plurality of storage nodes 715 each comprising a corresponding subset of the storage devices 706. Other clustered storage system arrangements comprising multiple storage nodes can be used in other embodiments. A given clustered storage system may include not only storage nodes 715 but also additional storage nodes coupled to network 104. Alternatively, such additional storage nodes may be part of another clustered storage system of the system 100. Each of the storage nodes 715 of the storage system 705 is assumed to be implemented using at least one processing device comprising a processor coupled to a memory.

The storage controller 708 of the content addressable storage system 705 is implemented in a distributed manner so as to comprise a plurality of distributed storage controller components implemented on respective ones of the storage nodes 715. The storage controller 708 is therefore an example of what is more generally referred to herein as a "distributed storage controller." In subsequent description herein, the storage controller 708 may be more particularly referred to as a distributed storage controller.

Each of the storage nodes 715 in this embodiment further comprises a set of processing modules configured to communicate over one or more networks with corresponding sets of processing modules on other ones of the storage nodes 715. The sets of processing modules of the storage nodes 715 collectively comprise at least a portion of the distributed storage controller 708 of the content addressable storage system 705.

The modules of the distributed storage controller 708 in the present embodiment more particularly comprise different sets of processing modules implemented on each of the storage nodes 715. The set of processing modules of each of the storage nodes 715 comprises at least a control module 708C, a data module 708D and a routing module 708R. The distributed storage controller 708 further comprises one or more management ("MGMT") modules 708M. For example, only a single one of the storage nodes 715 may include a management module 708M. It is also possible that management modules 708M may be implemented on each of at least a subset of the storage nodes 715.

Each of the storage nodes 715 of the storage system 705 therefore comprises a set of processing modules configured to communicate over one or more networks with corresponding sets of processing modules on other ones of the storage nodes. A given such set of processing modules implemented on a particular storage node illustratively includes at least one control module 708C, at least one data module 708D and at least one routing module 708R, and possibly a management module 708M. These sets of processing modules of the storage nodes collectively comprise at least a portion of the distributed storage controller 708.

Communication links may be established between the various processing modules of the distributed storage controller 708 using well-known communication protocols such as IP, Transmission Control Protocol (TCP), and remote direct memory access (RDMA). For example, respective sets of IP links used in data transfer and corresponding messaging could be associated with respective different ones of the routing modules 708R.

The storage devices 706 are configured to store metadata pages 710 and user data pages 712 and may also store additional information not explicitly shown such as checkpoints and write journals. The metadata pages 710 and the user data pages 712 are illustratively stored in respective designated metadata and user data areas of the storage devices 706. Accordingly, metadata pages 710 and user data pages 712 may be viewed as corresponding to respective designated metadata and user data areas of the storage devices 706.

A given "page" as the term is broadly used herein should not be viewed as being limited to any particular range of fixed sizes. In some embodiments, a page size of 8-KB is used, but this is by way of example only and can be varied in other embodiments. For example, page sizes of 4-KB, 16-KB or other values can be used. Accordingly, illustrative embodiments can utilize any of a wide variety of alternative paging arrangements for organizing the metadata pages 710 and the user data pages 712.

The user data pages 712 are part of a plurality of logical units (LUNs) or other storage volumes that are configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 712 can include any type of user data that may be utilized in the system 100. The term "user data" herein is therefore also intended to be broadly construed.

The content addressable storage system 705 in the embodiment of FIG. 7 is configured to generate hash metadata providing a mapping between content-based digests of respective ones of the user data pages 712 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 712. The hash metadata generated by the content addressable storage system 705 is illustratively stored as metadata pages 710 in the metadata area. The generation and storage of the hash metadata is assumed to be performed under the control of the storage controller 708.

Each of the metadata pages 710 characterizes a plurality of the user data pages 712. For example, a given set of user data pages representing a portion of the user data pages 712 illustratively comprises a plurality of user data pages denoted User Data Page 1, User Data Page 2, ... User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 706.

Each of the metadata pages 710 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 710 in an illustrative embodiment comprises metadata pages denoted Metadata Page 1, Metadata Page 2, ... Metadata Page m, having respective signatures denoted Signature 1, Signature 2, ... Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 705 is illustratively distributed among the control modules 708C.

In some embodiments, the content addressable storage system 705 comprises an XtremIO™ storage array suitably modified to incorporate the above described functionality.

In arrangements of this type, the control modules 708C, data modules 708D and routing modules 708R of the distributed storage controller 708 illustratively comprise respective C-modules, D-modules and R-modules of the XtremIO™ storage array. The one or more management modules 708M of the distributed storage controller 708 in such arrangements illustratively comprise a system-wide management module ("SYM module") of the XtremIO™ storage array, although other types and arrangements of system-wide management modules can be used in other embodiments. Accordingly, the above described functionality in some embodiments is implemented under the control of at least one system-wide management module of the distributed storage controller 708, utilizing the C-modules, D-modules and R-modules of the XtremIO™ storage array.

In the above-described XtremIO™ storage array example, each user data page has a fixed size such as 8-KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 708C such that control of the slices within the storage controller 708 of the storage system 705 is substantially evenly distributed over the control modules 708C of the storage controller 708.

The D-module allows a user to locate a given user data page based on its signature. Each metadata page also has a size of 8-KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 705 each illustratively comprise one or more IO operations directing that at least one data item of the storage system 705 be written to in a particular manner. A given write request is illustratively received in the storage system 705 from a host device, illustratively one of the host devices 102. In some embodiments, a write request is received in the distributed storage controller 708 of the storage system 705 and directed from one processing module to another processing module of the distributed storage controller 708. For example, a received write request may be directed from a routing module 708R of the distributed storage controller 708 to a particular control module 708C of the distributed storage controller 708. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 715 communicate with one another over a high-speed internal network such as an InfiniBand network. The C-modules, D-modules and R-modules coordinate with one another to accomplish various 10 processing tasks.

The write requests from the host devices identify particular data pages to be written in the storage system 705 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 705 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 705.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 706. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 705 correspond to respective physical blocks of a physical layer of the storage system 705. The user data pages of the logical layer are organized by LBA and have reference via respective content-based signatures to particular physical blocks of the physical layer.

Each of the physical blocks has an associated reference count that is maintained within the storage system 705. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 708C, 708D, 708R and 708M as shown in the FIG. 7 embodiment is presented by way of example only. Numerous alternative arrangements of processing modules of a distributed storage controller may be used in other embodiments.

Additional examples of content addressable storage functionality implemented in some embodiments by control modules 708C, data modules 708D, routing modules 708R and management module(s) 708M of distributed storage controller 708 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with virtual host upgrade functionality will now be described in greater detail with reference to FIGS. 8 and 9. Although described in the context of system 100, these platforms may also be used to implement at least portions of other information processing systems in other embodiments.

Figure 8:
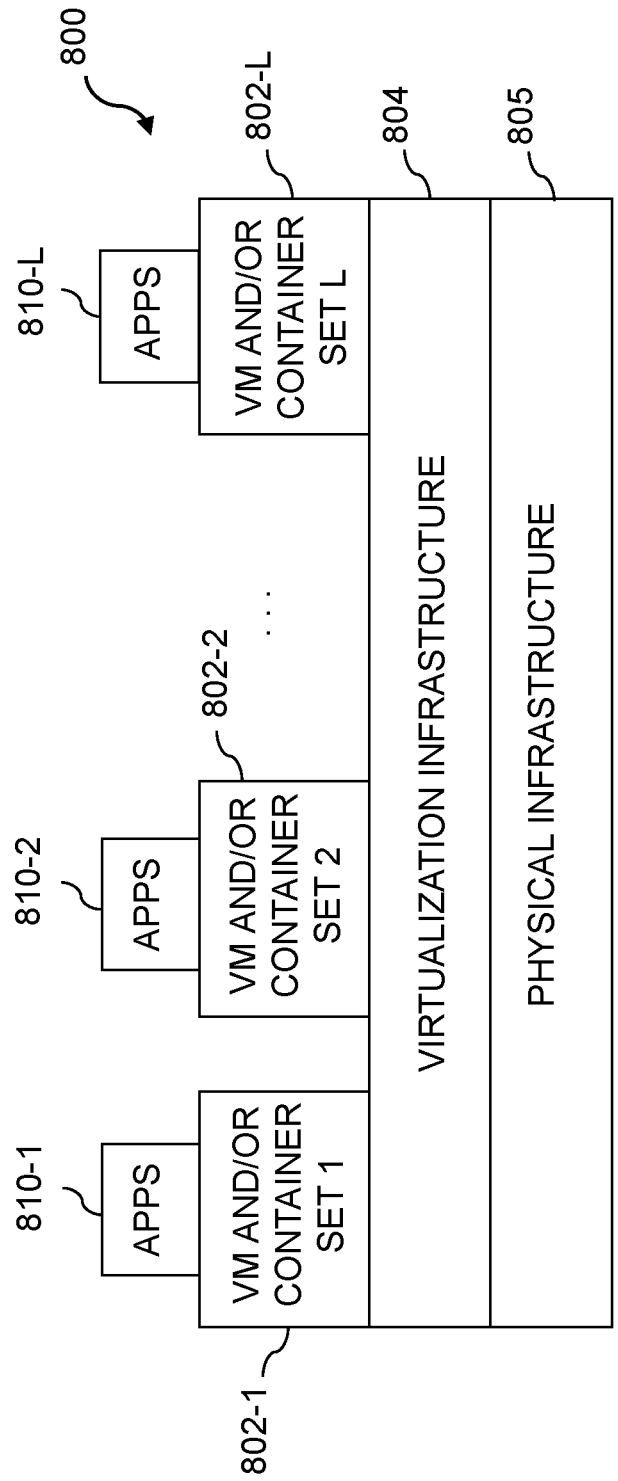
FIGS. 8 and 9 show examples of processing platforms that may be utilized to implement at least a portion of an information processing system in illustrative embodiments.
Figure 9:
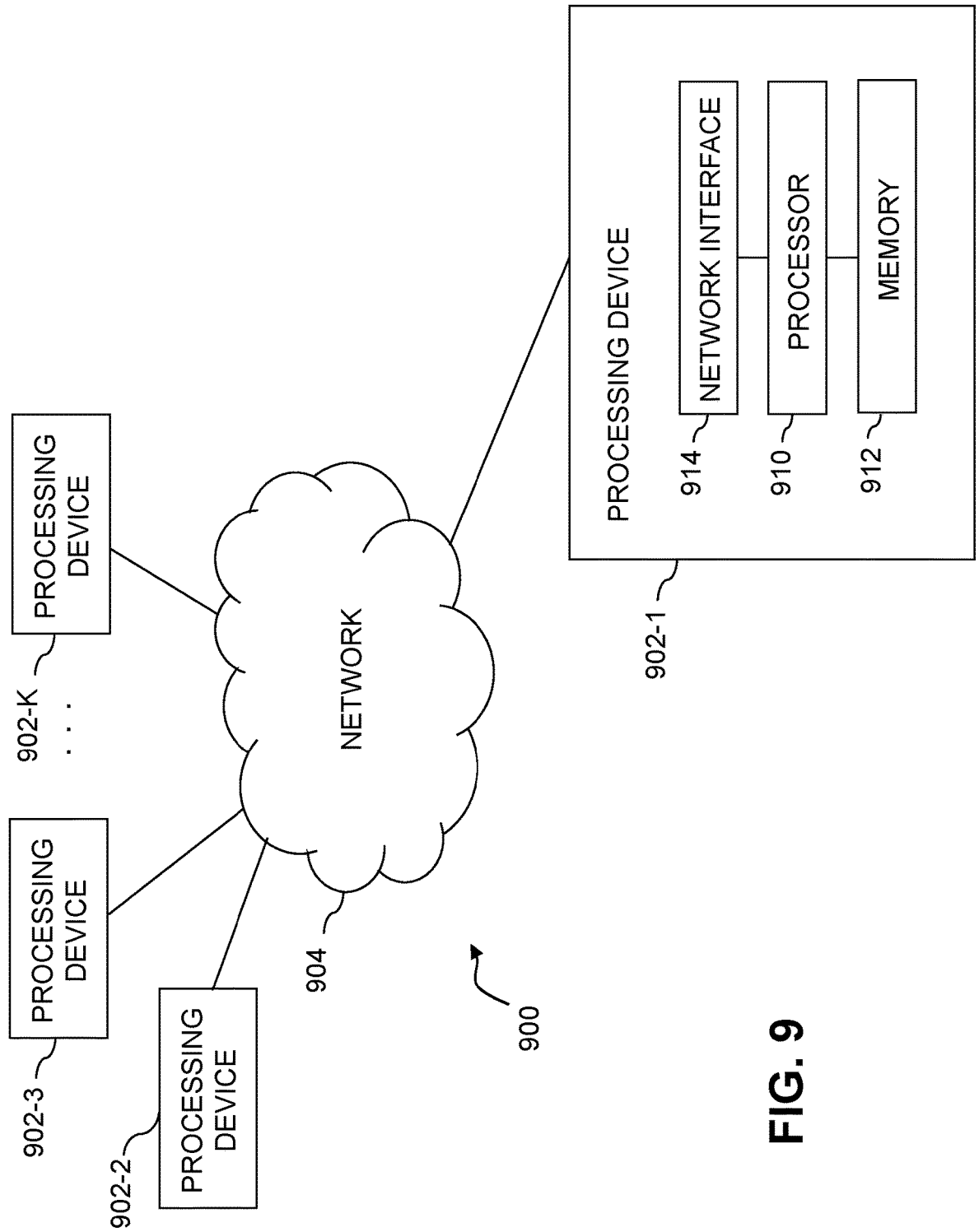

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide virtual host upgrade functionality of the type described above for one or more processes running on a given one of the VMs. For example, each of the VMs can implement virtual host upgrade functionality in the system 100.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can also provide virtual host upgrade functionality of the type described above. For example, a container host device supporting multiple containers of one or more container sets can implement one or more cores executing the virtual host upgrade functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the virtual host upgrade functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, system managers, and virtual host upgrade functionality. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device coupled to memory, the at least one processing device being configured:
to obtain a secured disk image comprising:
an encrypted manifest file;
an encrypted install binary; and
a plurality of other files that are not encrypted;
to obtain a certificate corresponding to the secured disk image;
to derive a public key based at least in part on the certificate;
to decrypt the manifest file and the install binary based at least in part on the public key;
to validate checksums for respective ones of the plurality of other files against corresponding checksums contained in the decrypted manifest file; and
to execute the decrypted install binary responsive to validation of the checksums for the respective ones of the plurality of other files.

2. The apparatus of claim 1
wherein the secured disk image comprises a concierge binary, the concierge binary comprising information indicating a location of the certificate;
wherein the at least one processing device is further configured to determine the location of the certificate based at least in part on the information contained in the concierge binary; and
wherein obtaining the certificate comprises obtaining the certificate from the determined location.

3. The apparatus of claim 2 wherein the certificate is stored at the determined location prior to the at least one processing device obtaining the secured disk image.

4. The apparatus of claim 2 wherein the secured disk image comprises an upgrade for a virtual host previously installed on the apparatus and wherein the certificate is stored at the determined location as part of an initial installation or upgrade of the virtual host on the apparatus by a previously obtained disk image.

5. The apparatus of claim 4 wherein the plurality of other files comprise a second certificate, the at least one processing device being further configured to store the second certificate in a predetermined location for use in validating a second disk image, the at least one processing device being configured to obtain the second disk image for use in a future upgrade of the virtual host.

6. The apparatus of claim 2 wherein the at least one processing device is further configured to validate the certificate based at least in part on information contained in the concierge binary.

7. The apparatus of claim 1 wherein the plurality of other files comprises at least some of software packages, executables, scripts, setup files and miscellaneous files that are utilized to upgrade a virtual host.

8. A method comprising:
obtaining a secured disk image comprising:
an encrypted manifest file;
an encrypted install binary; and
a plurality of other files that are not encrypted;
obtaining a certificate corresponding to the secured disk image;
deriving a public key based at least in part on the certificate;
decrypting the manifest file and the install binary based at least in part on the public key;
validating checksums for respective ones of the plurality of other files against corresponding checksums contained in the decrypted manifest file; and
executing the decrypted install binary responsive to validation of the checksums for the respective ones of the plurality of other files;
wherein the method is implemented by at least one processing device coupled to memory.

9. The method of claim 8
wherein the secured disk image comprises a concierge binary, the concierge binary comprising information indicating a location of the certificate;
wherein the method further comprises determining the location of the certificate based at least in part on the information contained in the concierge binary; and
wherein obtaining the certificate comprises obtaining the certificate from the determined location.

10. The method of claim 9 wherein the certificate is stored at the determined location prior to obtaining the secured disk image.

11. The method of claim 9 wherein the secured disk image comprises an upgrade for a virtual host previously installed on the apparatus and wherein the certificate is stored at the determined location as part of an installation process of the virtual host on the apparatus by a previously obtained disk image.

12. The method of claim 11 wherein the plurality of other files comprise a second certificate, the method further comprising storing the second certificate in a predetermined location for use in validating a second disk image, the at least one processing device being configured to obtain the second disk image for use in a future upgrade of the virtual host.

13. The method of claim 9 wherein the method further comprises validating the certificate based at least in part on information contained in the concierge binary.

14. The method of claim 8 wherein the plurality of other files comprises at least some of software packages, executables, scripts, setup files and miscellaneous files that are utilized to upgrade a virtual host.

15. A computer program product comprising a non-transitory processor-readable storage medium having stored therein program code of one or more software programs, wherein the program code, when executed by at least one processing device, causes the at least one processing device to perform a method comprising:
obtaining a secured disk image comprising:
an encrypted manifest file;
an encrypted install binary; and
a plurality of other files that are not encrypted;
obtaining a certificate corresponding to the secured disk image;
deriving a public key based at least in part on the certificate;
decrypting the manifest file and the install binary based at least in part on the public key;
validating checksums for respective ones of the plurality of other files against corresponding checksums contained in the decrypted manifest file; and
executing the decrypted install binary responsive to validation of the checksums for the respective ones of the plurality of other files.

16. An apparatus comprising:
at least one processing device coupled to memory, the at least one processing device being configured:

to build a secured disk image based at least in part on a manifest file, install binary, and a plurality of other files, the building of the secured disk image comprising:
  encrypting the manifest file using a private key, the manifest file comprising checksums corresponding to one or more of the other files;
  encrypting the install binary using the private key; and
  generating the secured disk image based at least in part on the encrypted manifest file, encrypted install binary, and the plurality of other files.

17. The apparatus of claim 16 wherein the at least one processing device is further configured:
  to generate the private key and a corresponding public key;
  to generate a certificate signing request based at least in part on the generated public and private keys;
  to submit the certificate signing request to a certificate authority; and
  to obtain a certificate from the certificate authority based at least in part on the submitted certificate signing request.

18. The apparatus of claim 17 wherein the plurality of other files comprises the certificate.

19. The apparatus of claim 17 wherein the at least one processing device is further configured:
  to build an initial installation disk image based at least in part on a second manifest file, second install binary, the certificate and a second plurality of other files, the building of the initial installation disk image comprising generating the initial installation disk image based at least in part on the second manifest file, second install binary, certificate and the second plurality of other files;
  wherein the initial installation disk image is configured to be provided to a user device for installing a virtual host, the certificate in the initial installation disk image being configured to be stored in a secure location associated with the user device and configured to be utilized to derive a public key for decrypting the encrypted manifest file and install binaries of the secured disk image; and
  wherein the secured disk image is configured to be provided to the user device for upgrading the virtual host installed on the user device by the initial installation disk image.

20. The apparatus of claim 16 wherein the plurality of other files comprises at least some of software packages, executables, scripts, setup files and miscellaneous files that are utilized to upgrade a virtual host.

* * * * *